United States Patent [19]

Alfio

[11] 4,157,886
[45] Jun. 12, 1979

[54] DEVICE FOR EXTRACTING VERY LONG CORES FROM RUBBERY HOSE ARTICLES FORMED THEREABOUT

[75] Inventor: Deregibus Alfio, Padua, Italy

[73] Assignee: The Goodyear Tire & Rubber Company, Akron, Ohio

[21] Appl. No.: 841,789

[22] Filed: Oct. 13, 1977

[30] Foreign Application Priority Data

Apr. 5, 1977 [IT] Italy ............................... 23162 A/77

[51] Int. Cl.² ............................................. B29C 7/00
[52] U.S. Cl. .................................... 425/438; 249/63
[58] Field of Search ................... 425/436, 438; 249/63

[56] References Cited

U.S. PATENT DOCUMENTS 3,946,483  3/1976  Holden et al. ............... 425/436 R X Primary Examiner—J. Howard Flint, Jr.
Attorney, Agent, or Firm—R. S. Washburn

[57] ABSTRACT

A method for axially extracting a rubbery hose article of manufacture of great length from the correspondingly long core about which the article has been formed and vulcanized, comprising the steps of positioning the article having its core thereinto on an correspondingly long longitudinally displaceable support having an upper surface adapted for frictionally engaging the hose article, securing one end portion of the core, external to the hose, in a stationary location, and longitudinally displacing the support for spacing the same from said location, whereby a pull is exerted at any point of the length of the hose for causing the core to be extracted from the hose. A device for carrying out the method.

13 Claims, 4 Drawing Figures

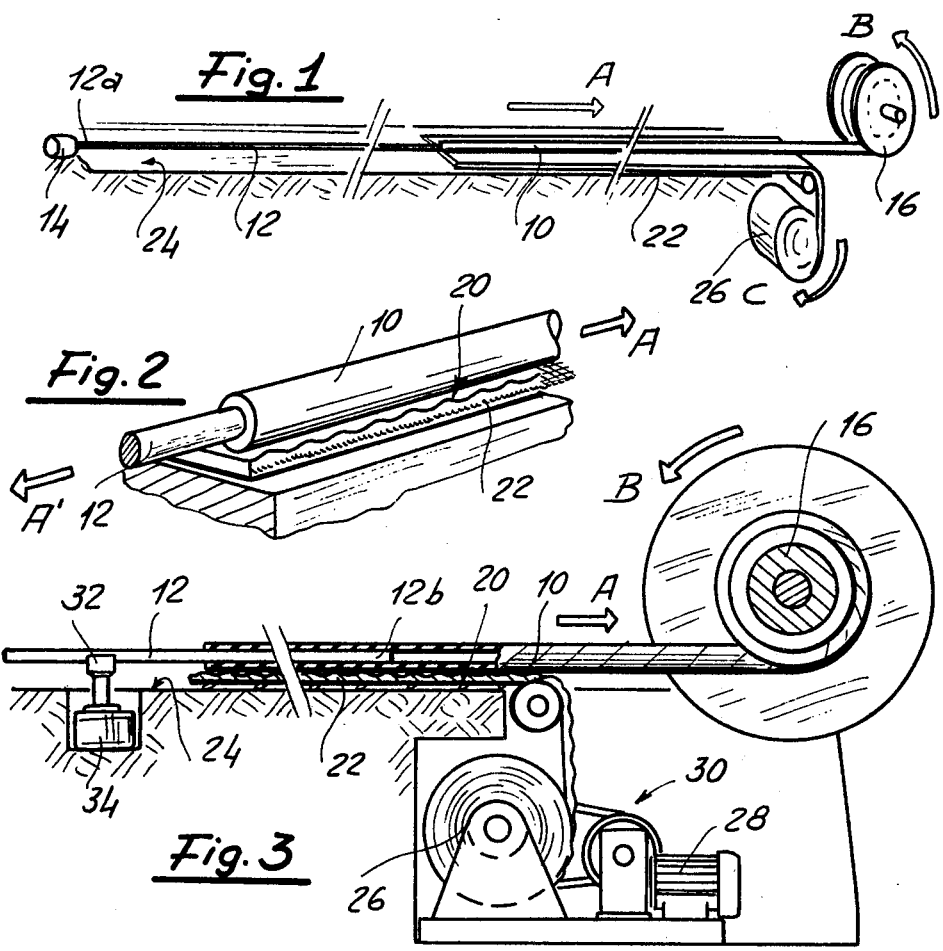
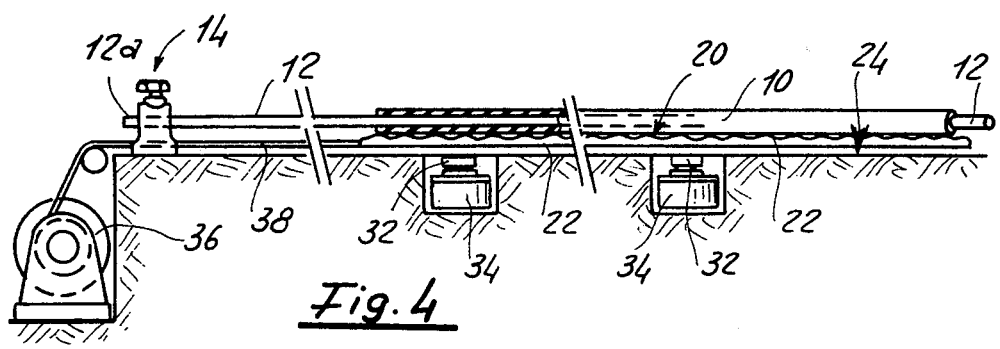

DEVICE FOR EXTRACTING VERY LONG CORES FROM RUBBERY HOSE ARTICLES FORMED THEREABOUT

BACKGROUND OF THE INVENTION

1. Field of the Invention

This invention concerns a device for its putting into effect, designed for the carrying-out, with at least prevailingly mechanical means and in conditions of high efficiency and correctness, of the operation of separation of a tubular article of great length, in particular of a piece of rubber hose, whether or not reinforced, from the core or elongated body, in general metallic, around which the article is previously manufactured by helical winding of a number of layers or tapes in raw rubber, possibly and partly reinforced with a textile structure, and then treated so as to obtain the vulcanization of the rubber or the elastomeric material forming the main constituent of the industrial product.

More specifically, this invention concerns equipment for the industrial uses indicated, and adapted to constitute an element or operative unit of a complete plant for the manufacture of pieces of hose, of great length, in natural or synthetic rubber, such a plant being the subjet of another contemporaneous application by the same applicant, to whose context reference is herein made, o for the better understanding of some of the technical and industrial presuppositions of this same invention.

Moreover, the above mentioned application of this invention does not constitute a limitation of the domain of the patent application, in that the invention subject here could find advantageous industrial uses in equivalent fields.

2. Description of the Prior Art

It is known in the art to which this invention appertains, that the extraction of a metallic core, of uniform diameter, from a tubular article preformed and treated (in particular vulcanized) around the said core, gives rise to not indifferent problems and difficulties, despite the predisposition of a suitable detaching agent on the surface of the said core, difficulties which become more serious and finally almost insuperable, with the increase in the length of the core and thus of the article. It must in fact be remembered that an article of this kind, with an essentially elastic nature, tends to contract when it is subjected to stresses of tension, which prevent its movement. In fact, it is not possible, with this industrial production, to extract the core from the article (or vice-versa) by simply exerting traction in a contrary direction on one extremity of the article and respectively on the opposite extremity of the core.

In practice, according to the present technique, it is necessary to carry out all the operations and handling exusively by hand. A necessarily considerable number of operators, expert and attentive, grasp the outside of the article, in a corresponding number of strictly spaced intervals and, acting synchronously, they move the tubular article, in an axial direction, in such a way as to make it slide uniformly at every point of its length around the core. An operation of this kind, other than obviously requiring the availability of numerous personnel and taking a not indifferent length of time (generally proportional to the length of the article), is obviously not feasible when this length exceeds determined limits.

SUMMARY OF THE INVENTION

This having been stated, the subject of this invention is means for its execution, for the mechanical and correct realization of these operations, and in conditions such as to practically exclude every limit in length of the article and core to be mutually extracted.

Essentially the method consists in placing the article, enclosing the relative core, on to a transporting plane (single or subdivided into a succession of parts) generally horizontal and of corresponding length, supported in a moveable way, relatively to the core of the article in a direction parallel to the axis of the article itself, and to make the said plane move in a uniform way along its entire length, whilst the core is restrained at its extremity opposite to the moving direction of the transporting plane.

Preferably, the device for the realization of the said method comprises the transporting plane made up of a conveyor carpet, unitary or sectioned, inextensible longitudinally, whose upper surface is preferably in elastomeric material and/or including notches and/or reliefs very close to each other or in any case unevenness such as to assure good adherence with the article placed on it, and means to make the said carpet move in a uniform way at every point along its length, so as to consequently make the article move in a corresponding way, at every point, whilst the core is held in such a way that it cannot follow the said movement.

According to a complementary characteristic of the invention, the device is completed by support means of the said core, adapted to sequentially intervene as the said core is uncovered by the tubular article in the course of extraction, at sufficiently short intervals to prevent the said core from lowering and/or inflecting so weighing down upon the tubular material, in proximity of the point in which it is freed from the relative core.

According to another complementary characteristic of the invention, the said conveying carpet is connected, in correspondance to the extremity opposite that which is connected to certain means to make it move in the said way, to other means which make it move in the opposite way, to make it return to the initial position, in preparation for a successive work cycle.

Preferably, the means which make the said carpet move in the required way, are made up of winches or windlasses.

These and other more specific characteristics of the invention together with the effects which result, will appear more evident in the course of the following detailed description of a not exclusive example of its realization, reproduced in its essential elements, in the drawings;

BRIEF DESCRIPTION OF THE DRAWINGS

FIG. 1 axonometrically and schematically represents, with* some interruptions and shortenings in its length (for evident necessity of the size of the drawing) the device according to the invention;

FIG. 2 perspectively and fragmentarily represents, on a larger scale, a detailed of the conveyor carpet, presenting the combination of good adherence to the surface of the tubular article weighing down on it; of its non-extensibility and resistance to tensile stress;

FIG. 3 represents some of the preferred technical solutions for the realization of the device, represented in cross-section and a partial view, in its longitudinal and symmetrically vertical plane, and in correspondance of its extremity c where the tubular article is freed from the respective core;

FIG. 4 similarly represents other technical solutions, in a corresponding cross-section view of the device, at its opposite extremity.

DESCRIPTION OF THE PREFERRED EMBODIMENTS

With particular reference to the figures of the drawing: in its entirety, and as schematically shown in FIG. 1, this method, in order to free the tubular article 10 of the type considered, from the relative core 12, generally metallic, with full or tubular section, and in any case rigid, traction is exerted onto the said article in a determined direction, for example in the direction indicated as A, whilst the core 12, is restrained from this traction, for example by fixing its extremity 12a (which is allowed to protude from the article, during its manufacture) to a suitable fixing device 14. The article 10, as it is freed from the core 12 (in FIG. 3 the opposite extremity, shown as 12b, of the said core is illustrated) is recuperated and collected for example, by winding it around a bobbin 16, or a reel, or other, set in rotation in the direction B.

However much it is advantageous, if not for other than the convenience of space, to make the said article move in the direction A with respect to the core 12, which is kept stationary, the possibility of adopting an inverse procedure is not excluded, moving the core 12 in the direction A, whilst a resistance to this movement (which results in the said direction A) is applied to the article, all as shown in FIG. 2.

However, the essential characteristic of the invention is that this movement (or resistance) of the article, which obviously must be kept straight, initially along its entire length and successively on all its parts still occupied by the core 12, is applied by acting substantially on every point of its said length, in such way that the article is not subjected to axial tensions, which could give rise to deformities, even localized, in a transversal o radial direction.

In order to obtain such a result, the article, originally containing the respective core, is placed on the upper surface 20 of a material, generally tape-like, illustrated by the tape 22, a surface which is such as to offer a high resistance to friction. Preferably, this surface 20 is made up of rubber or other elastomeric material, possessing a high friction coefficient. This surface can be transversally undulated (as shown in the figures) or indented, or containing a number of small, very close reliefs, in order to obtain small deformities or local deflections which encourage good adherence. This surface 20 could also possess longitudinal grooves, and/or the tape 22 could be bent in a transversal sense, for example, by means of localization of roller or sliding supports, on the edges of the lower face of the tape, in order to increase the surface in contact with the article.

Another important condition is that this tape, if subjected to a movement in direction A, according to the preferred type of execution of the invention, moves in an identical way along its entire length. Therefore, the transporting and moving tape 22 must be non-extensible, for example by including, within its thickness, a tensile resisting reinforcement, for example a fibrous structure and, preferably, and incorporating threads or thin and narrow metallic tapes.

In the type of th execution represented in FIGS. 1 and 3, the tape 22 is at least as long as the article, it is carried along a horizontal support plane 24, in a sliding manner, for example with the use of rollers, lubrificating materials and other, and is restrained at its extremity, opposite the restraining point 14 of the core 12, to a traction system, for example to a winch 26, on to which it is wound, and which is set in rotation for example by means of a motor 28 and a transmission system 30, including preferably a variator, in order to obtain adaption of the moving speed to the various requirements and conditions of service.

Furthermore, in order to sustain the core 12 of the article, as this becomes uncovered following the advancement of the article, support means 32 can be arranged, raisable for example by jacks 34 which are activated in sequence, or such as to present under the said core, even with different movements, for example transversal, so as to prevent the core from weighing down locally on to the article, more precisely on its terminal part.

At the end of every extraction operation, the tape 22 can be recuperated and put back into its initial position, for example by means of a recuperating windlass 36 which rewinds a cable or stay wire 38 (FIG. 4) restrained at the extremity of the tape, opposite to that connected to the windlass 26.

The device described above and represented in the sheet annex of drawings, is a not limitative example for the realization of the method subject here, could also be carried out by adopting numerous different constructive and technical solutions. For example, along the length of the article two or more tapes connected in sequence could be arranged, attaching each one to a pulling winch and to a recuperating winch, and operating in synchronism, at least for the stretches on which the article progressively advancing in direction A is still present.

The carrying and pulling surface 20, by adherence could be made up of the upper horizontal branch of a carpet or conveyor track, operating in a closed circuit. This technical solution allows the elimination of necessarily returning to the initial position. Similarly, the length of this surface could be split into a number of conveying carpets, operated in such a way as to assume and keep equal linear speeds, and other, the whole without leaving the range of the invention.

Similarly, equivalent results and actions could be obtained, in conformity with that described with reference to FIG. 2, by placing the article 10 on an adhering surface 20, which surface is stationary, whilst the core 12 can be entirely moved in the direction A', for example by restraining the extremity to a trolley advancing for example on rails along a path defining the prolongation of the axis of the article, for a distance at least equal to the length of the article itself.

Furthermore, the device, operated by applying the above-described technical solutions and other equivalent, could be integrated with complementary means adapted to favour the detachment and the relative movement between core and article. In addition to the preventive application (and that is before the manufacturing of the tubular article) of lubrificating substances or of detaching agents adapted to reduce adherence between the internal surface of the article and that of the core around which it has been manufactured, this adherence could be reduced and the detachment could be made easier for example by introducing compressed air inside the core, in correspondance with one of its extremities, or also in different points of its length, by using tubular cores suitably punctured or fessured. The compressed air could be advantageously applied in such a way as to penetrate between the core and the article, passing through the length in direction A, in order to contribute substantially to the relative movement. An equivalent effect could be obtained by introducing, under the same conditions, in the interface between the core and the article, a liquid agent, whose non-compressibility assures an effect of swelling on the article itself.

The initial detachment between core and article could also be favoured by slight alternative movements of transversal rolling of the article on the transporting surface 20, carried out mechanically for example by making the tape which forms the said surface move in a transversal way, or also vibrations, acting for example on guides, for example rollers, arranged at suitable intervals on both sides of the article lying on the surface 20, means which however assure the support of the article itself, whose great length and whose sensitive flexibility could give rise to movements lateral with respect to its correct straight bearing.

For these reasons it must be understood that in the domain of this industrial patent are included devices and means adapted to the realization of the method subject here, and in any case, forming part of, in particular, the definitions expressed in any one or more of the following claims.

I claim:

1. Device for the extraction of tubular articles, in particular pieces of great length of rubber hose, manufactured and vulcanized around a core of corresponding length, characterized by comprising, for the formation of a transporter carrying plane, a tape-like element, of a length almost equal to that of the article to be extracted, supported in a moveable way on an underlying support structure, and connected at one of its extremities to suitable means to bring about movement in a direction parallel to the axis of the article to be extracted, placed and weighing on the upper surface of the said tape-like element, and means to restrain the extremity of the core of the article, opposite to the direction of the movement of the said element, in such a way as to prevent the said core from following the movements of the tubular article, due to the dragging exerted essentially along its entire length, on the said article, as a result of the movement of the said tape-like carrying element.

2. Device as in claim 1, characterized by the fact that the said tape-like element is formed by a material essentially non-extensible but flexible, connected at one end to a winch or windglass adapted to carry out the dragging, by rolling, at a point lower than that where the core present in the article ends.

3. Device as in claim 1, characterized by the fact that the said tape-like element has, on its upper surface a longitudinal grooving or notching, in which the article can rest, after being positioned, before the carrying out of the operation adhering to the said upper surface on an area such as to assure the effect of dragging, through friction.

4. Device as in claim 1, characterized by the fact that the upper surface of the carrying and dragging tape-like element has a sequence of close grooves or notches and placed in a direction transversal to the carried article, in order to improve the conditions of adherence and dragging, through friction, between the said plane and the said article.

5. Device as in claim 1, characterized by the fact that the said carrying, dragging plane is formed, at least in correspondance with its layer which makes up its upper surface on which the article is placed, by essentially elastic material and which possesses a high friction coefficient, such as rubber, or equivalent.

6. Device as in claim 5, characterized by the fact that the said tape-like element comprises a reinforcing structure, including for example and in particular yarns or threads, possibly metallic, so as to assure its non-extensibility and its tensile strength.

7. Device as in claim 1, characterized by comprising on at least one point and preferably on a number of points distributed along its length, below the tape-like dragging element, and more precisely in the vertical plane containing the axis of the core from which the tubular article must be extracted, means to locally support the said core, at points where it is progressively uncovered by the article in course of extraction, in order to release the said article from the stresses due to the weight of the said core.

8. Device as in claim 7, characterized by the fact that the said local support means comprise elements which, in the waiting position are lowered below the plane defined by the said support structure, and are connected to means which bring about their raising, after the passing of the extremity of the a carrying and dragging tape-like element.

9. Device as in claim 1, characterized by comprising means for returning the carrying and dragging tape-like plane to its initial position, at the end of every extraction cycle.

10. Device as in claim 1 characterized by comprising two or more carrying and dragging tape-like elements, arranged in succession so as to jointly support and carry the said article.

11. Device as in claim 1, characterized by comprising means for the recuperation and collection, in particular in rolls, of the tubular material progressively freed from the said core.

12. Device as in claim 1, characterized by being integrated by means adapted to send, to the interface between the core and te the tubular article, a fluid such as to favour the detachment of the said article from the relative o core.

13. Device as in claim 12, characterized by the fact that means are arranged to send, to the said interface, a fluid in a direction such as to at least contribute to the relative movement of the said article around the said core.

* * * * *